(12) United States Patent
Tung et al.

(10) Patent No.: US 7,453,547 B2
(45) Date of Patent: Nov. 18, 2008

(54) METHOD OF FORMING LIQUID CRYSTAL DISPLAY PANEL

(75) Inventors: Hsiu-Chi Tung, Taipei (TW); Chih-Ming Chang, Chungli (TW); Po-Lun Chen, Chia-I (TW)

(73) Assignee: AU Optronics Corp., Hsin-Chu (TW)

( * ) Notice: Subject to any disclaimer, the term of this patent is extended or adjusted under 35 U.S.C. 154(b) by 640 days.

(21) Appl. No.: 10/908,024

(22) Filed: Apr. 25, 2005

(65) Prior Publication Data

US 2006/0152654 A1 Jul. 13, 2006

(30) Foreign Application Priority Data

Jan. 12, 2005 (TW) .............................. 94100846 A

(51) Int. Cl.
*G02F 1/1368* (2006.01)
*G02F 1/1335* (2006.01)

(52) U.S. Cl. .................. 349/187; 349/107; 349/114

(58) Field of Classification Search .................. 349/42, 349/43, 106, 107, 114, 122, 138, 187, 113; 430/7, 321; 359/891; 345/88
See application file for complete search history.

(56) References Cited

U.S. PATENT DOCUMENTS

| | | | | |
|---|---|---|---|---|
| 6,172,728 B1 * | 1/2001 | Hiraishi | ...................... | 349/139 |
| 6,661,484 B1 * | 12/2003 | Iwai et al. | .................... | 349/107 |
| 2002/0054263 A1 * | 5/2002 | Kim et al. | .................... | 349/123 |
| 2004/0227877 A1 * | 11/2004 | Jeong et al. | .................. | 349/114 |
| 2005/0024560 A1 * | 2/2005 | Yang et al. | .................. | 349/114 |
| 2007/0182907 A1 * | 8/2007 | Ohmuro et al. | ............. | 349/144 |

FOREIGN PATENT DOCUMENTS

| | | |
|---|---|---|
| JP | 07-168017 | 7/1995 |
| JP | 2004-287191 | 10/2004 |

* cited by examiner

*Primary Examiner*—Dung Nguyen
*Assistant Examiner*—Tai Duong
(74) *Attorney, Agent, or Firm*—Winston Hsu

(57) ABSTRACT

An LCD panel includes an array substrate, a color filter substrate positioned above the array substrate, a dielectric layer disposed on the array substrate facing the color filter substrate, and a liquid crystal layer interposed between the array substrate and the color filter substrate. The color filter substrate includes a plurality of red pixel regions, green pixel regions, and blue pixel regions, and the dielectric layer has different thickness corresponding to the red pixel regions, the green pixel regions, and the blue pixel regions. Accordingly, the liquid crystal layer has a first thickness corresponding to the blue pixel regions, a second thickness corresponding to the green pixel regions, and a third thickness corresponding to the red pixel regions. The first thickness is less than the second thickness, and the second thickness is less than the third thickness.

12 Claims, 8 Drawing Sheets

METHOD OF FORMING LIQUID CRYSTAL DISPLAY PANEL

This application claims the benefit of Taiwan application Serial No. 941 00846, filed Jan. 12, 2005, the subject matter of which is incorporated herein by reference.

BACKGROUND OF INVENTION

1. Field of the Invention

The present invention relates to an LCD panel and method for manufacturing the same, and more particularly, to an LCD panel having different cell gaps corresponding to different pixel regions and method for manufacturing the same.

2. Description of the Related Art

A liquid crystal display (LCD) has gradually replaced a conventional cathode ray tube (CRT) display due to its small size, low radiation, and low power consumption. Generally speaking, an LCD panel includes an array substrate, a color filter substrate, and a liquid crystal layer interposed therebetween. The array substrate includes a plurality of pixel regions defined by a plurality of scan lines arranged in parallel, and a plurality of data lines arranged in parallel and perpendicular to the scan lines. Each pixel region is controlled by a thin film transistor to drive liquid crystal molecules to rotate in different extents for adjusting brightness outputs. In addition, the color filter substrate includes a plurality of red color filters, green color filters, and blue color filters corresponding to each pixel region so that the LCD panel can output high-quality color images. The LCD panel is not actively luminant, and thus is mainly classified into a transmissive type LCD, a reflective type LCD, and a transflective type LCD.

Please refer to FIG. 1, which is a schematic diagram of a conventional LCD panel 10. For the sake of convenience and clear illustration, FIG. 1 only shows a red pixel region, a green pixel region, and a blue pixel region. As shown in FIG. 1, the LCD panel 10 includes an array substrate 12, a color filter substrate 14, and a liquid crystal layer 16 interposed between the array substrate 12 and the color filter substrate 14. The color filter substrate 14 can be defined into a plurality of red pixel regions 18, green pixel regions 20, and blue pixel regions 22, and the array substrate 12 includes a plurality of thin film transistors 24 corresponding to each red pixel region 18, each green pixel region 20, and each blue pixel region 22. The array substrate 12 further includes a transparent conductive layer 26, which serves as pixel electrodes, electrically connected to the drain electrode 28 of each thin film transistor 24. In addition, the color filter substrate 14 includes a plurality of red color filters 30, green color filters 32, and blue color filters 34 disposed corresponding to each red pixel region 18, each green pixel region 20, and each blue pixel region 22 for providing color display images. The LCD panel 10 further includes a back light module (not shown) positioned behind the array substrate 12 for providing a light source.

An LCD panel inherently suffers a problem of color deviation because light beams with different wavelengths, e.g. red light, green light, and blue light, have different phase differences when passing through liquid crystal molecules. In view of this problem, the conventional LCD panel 10 alters the thickness of the red color filters 30, the green color filters 32, and the blue color filters 34 to obtain different cell gaps, so as to calibrate the phase differences. As shown in FIG. 1, the red color filters 30 are the thinnest, the green color filters 32 are less thin, and the blue color filters 34 are the thickest. However, adjusting the thickness of the color filters increases the manufacture cost of the LCD panel, and reduces the yield and reliability of the color filters.

SUMMARY OF INVENTION

It is therefore a primary object to provide an LCD panel and method for manufacturing the same to overcome the color deviation problem.

An LCD panel is provided. The LCD panel includes an array substrate, a color filter substrate positioned above and in parallel to the array substrate, a dielectric layer positioned on the surface of the array substrate facing the color filter substrate, and a liquid crystal layer interposed between the array substrate and the color filter substrate. The color filter substrate includes a plurality of red pixel regions, green pixel regions, and blue pixel regions, and the dielectric layer has different thickness corresponding to the red pixel regions, the green pixel regions, and the blue pixel regions. Accordingly, the liquid crystal layer has a first thickness in the blue pixel regions, a second thickness in the green pixel regions, and a third thickness in the red pixel regions. The first thickness is less than the second thickness, and the second thickness is less than the third thickness.

Accordingly, a method for manufacturing an LCD panel is also disclosed. A color filter substrate including a plurality of red pixel regions, green pixel regions, and blue pixel regions is provided. Then, an array substrate including a plurality of reflection regions and transmission regions is provided. Each reflection region and each transmission region correspond to each red pixel region, each green pixel region, and each blue pixel region. Subsequently, a dielectric layer is formed on the array substrate. The dielectric layer has different thickness in the transmission regions of the red pixel regions, the green pixel regions, and the blue pixel regions. Following that, the color filter substrate and the array substrate are assembled together. Finally, a liquid crystal layer is interposed between the array substrate and the color filter substrate.

By adjusting the thickness of the dielectric layer to make different cell gaps of the liquid crystal layer in the red pixel regions, the green pixel regions, and the blue pixel regions, the phase differences are calibrated.

These and other objectives will no doubt become obvious to those of ordinary skill in the art after reading the following detailed description of the preferred embodiment that is illustrated in the various figures and drawings.

DETAILED DESCRIPTION

Figure 1:
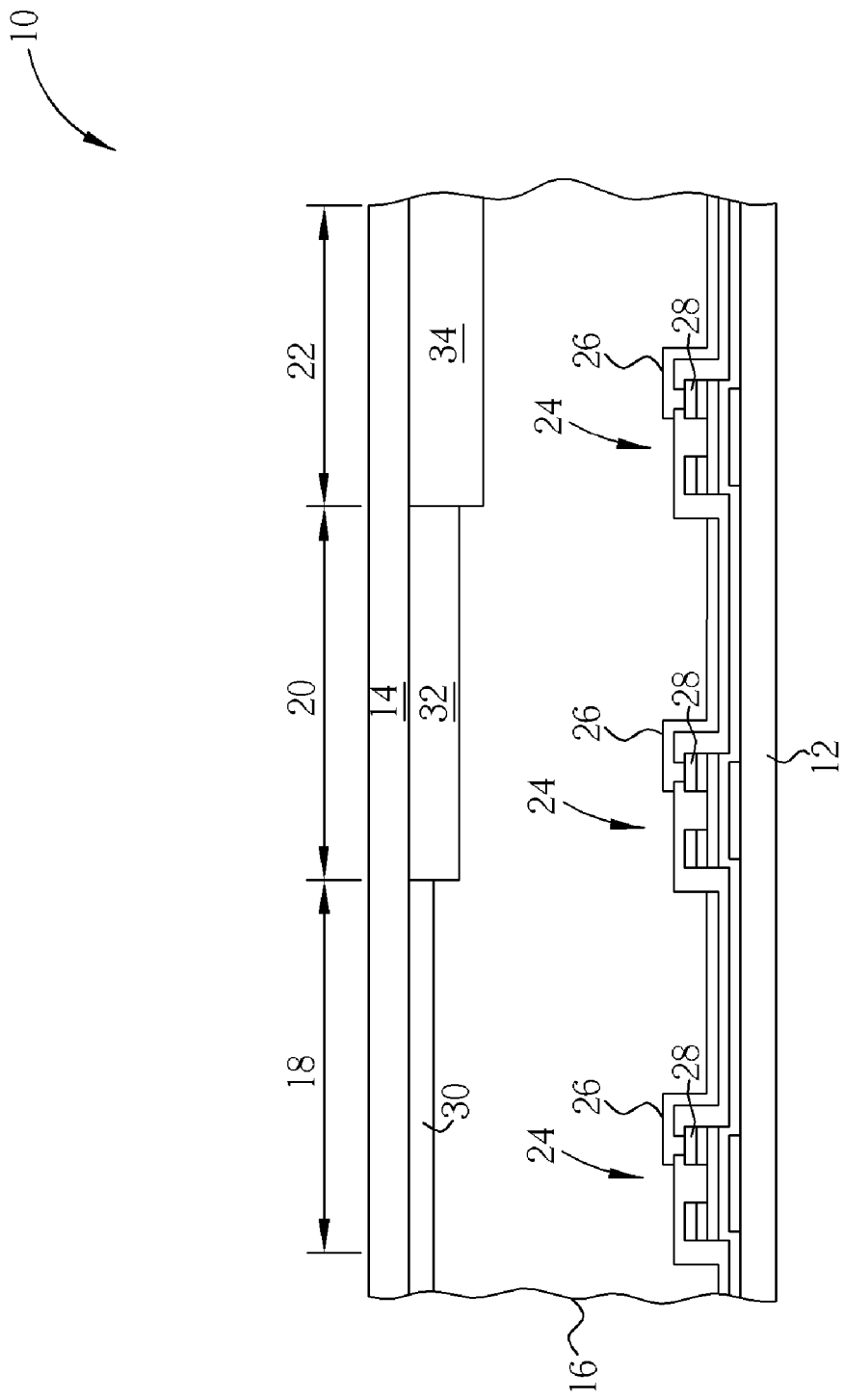
FIG. 1 is a schematic diagram of a conventional LCD panel.
Figure 2:
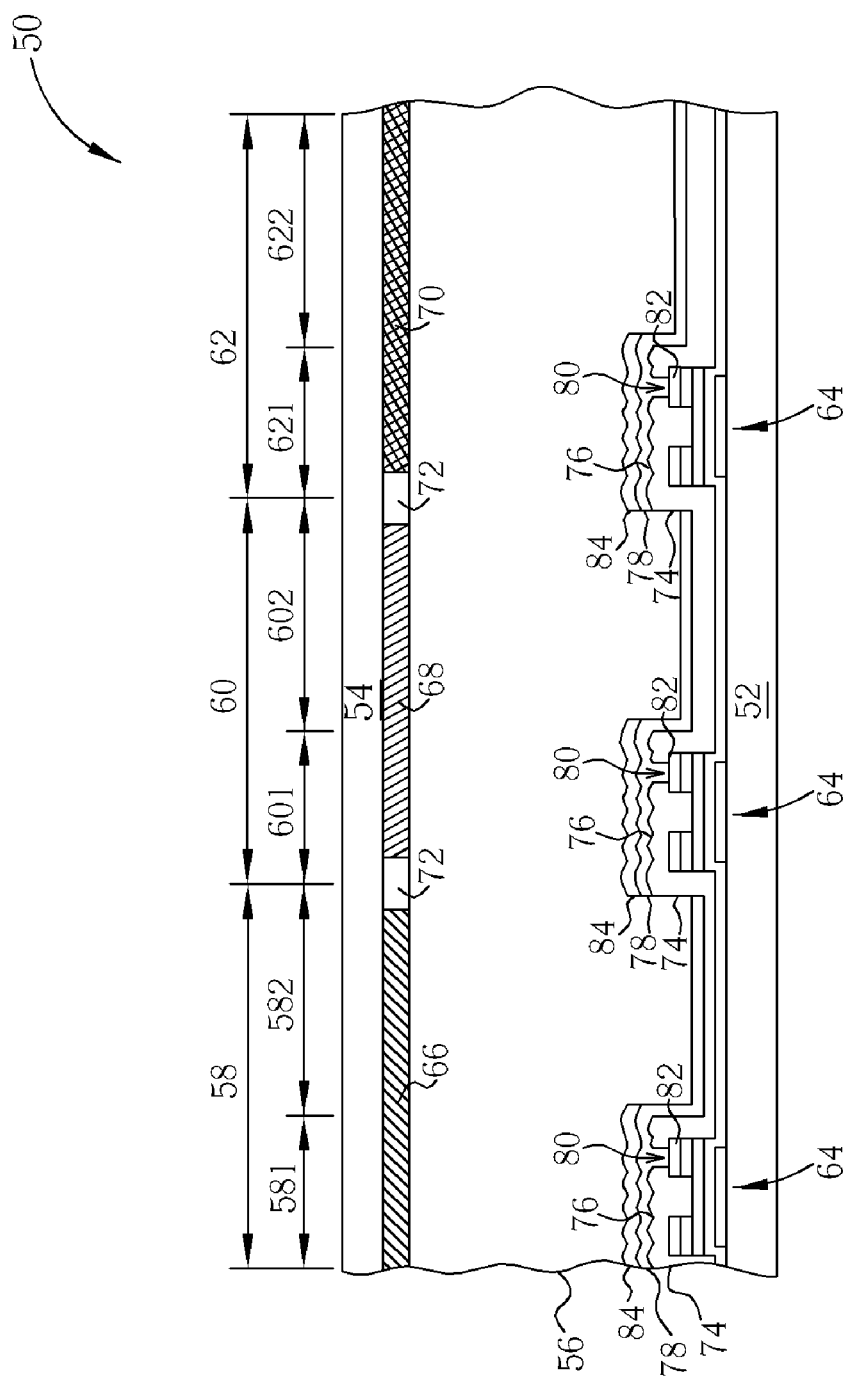
FIG. 2 is a schematic diagram of a transflective LCD panel according to a preferred embodiment of the present invention.
Figure 3:
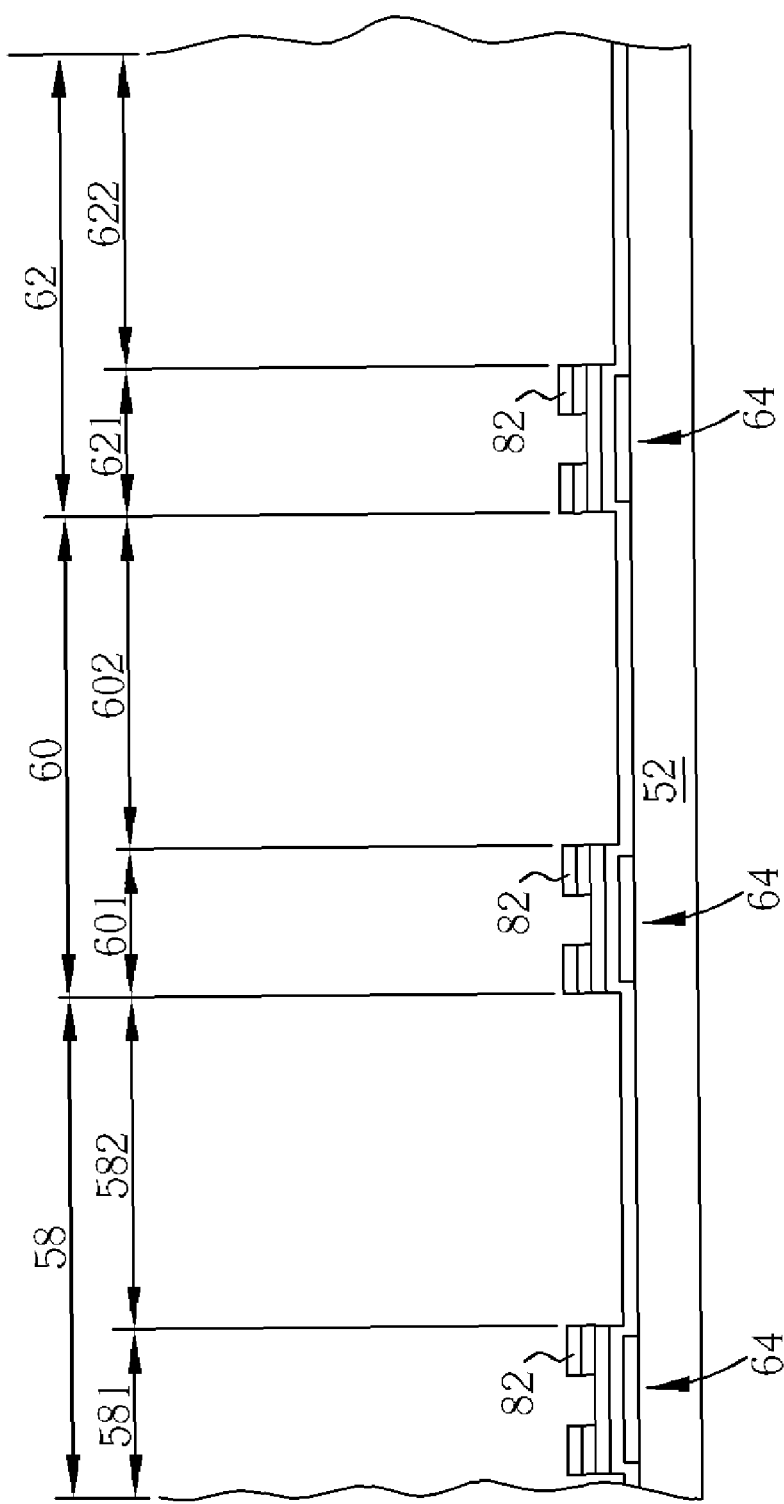
FIG. 3 through FIG. 8 are schematic diagrams illustrating a method for manufacturing the transflective LCD panel shown in FIG. 2 according to a preferred embodiment of the present invention.

Please refer to FIG. 2, which is a schematic diagram of a transflective LCD panel 50 according to a preferred embodiment of the present invention. For the sake of convenience and clear illustration, FIG. 2 only shows a red pixel region, a green pixel region, and a blue pixel region. As shown in FIG. 2, the transflective LCD panel 50 includes an array substrate 52, a color filter substrate 54, and a liquid crystal layer 56 interposed between the array substrate 52 and the color filter substrate 54. The color filter substrate 54 can be defined into a plurality of red pixel regions 58, green pixel regions 60, and blue pixel regions 62. The array substrate 52 can be defined into a plurality of reflection regions 581, 601, 621 and transmission regions 582, 602, 622, wherein a reflection region 581 and a transmission region 582 are corresponding to each red pixel region 58, a reflection region 601 and a transmission region 602 are corresponding to each green pixel region 60, and a reflection region 621 and a transmission region 622 are corresponding to each blue pixel region 62. In addition, the array substrate 52 includes a plurality of thin film transistors 64 respectively disposed in each reflection region 581 of the red pixel regions 58, each reflection region 601 of the green pixel regions 60, and each reflection region 621 of the blue pixel regions 62. The color filter substrate 54 includes a plurality of red color filters 66 positioned in each red pixel region 58, a plurality of green color filters 68 positioned in each green pixel region 60, and a plurality of blue color filters 70 positioned in each blue pixel region 62. The red color filters 66, the green color filters 68, and the blue color filters 70 have the same thickness, and are isolated by a black matrix 72 to reduce light leakage.

The transflective LCD panel 50 further includes a dielectric layer 74 disposed on the surface of the array substrate 52. The dielectric layer 74 positioned in the reflection regions 581, 601, and 621 has a rough structure 76 to diffract incident light beams, while the dielectric layer 74 positioned in the transmission regions 582, 602, and 622 has different thickness. Accordingly, the liquid crystal layer 56 positioned in the transmission region 582 of each red pixel region 58 has a third thickness, the liquid crystal layer 56 positioned in the transmission region 602 of each green pixel region 60 has a second thickness, and the liquid crystal layer 56 positioned in the transmission region 622 of each blue pixel region 62 has a first thickness. The first thickness is less than the second thickness, and the second thickness is less than the third thickness. Furthermore, the transflective LCD panel 50 includes a conductive layer 78 disposed on the surface of the dielectric layer 74, and the conductive layer 78 may be transparent. The conductive layer 78, which serves as pixel electrodes, is electrically connected to the drain electrode 82 of each thin film transistor 64 with a plurality of contact holes 80. The transflective LCD panel 50 also includes a reflection layer 84, which serves as reflection electrodes, disposed on the conductive layer 78 in the reflection regions 581, 601, and 621. In this embodiment, the thin film transistor 64 is a bottom gate thin film transistor. However, the present invention is not limited by this embodiment, and different types of thin film transistors, such as a top gate thin film transistor, can be adopted where necessary.

As above-mentioned, the cell gaps must be calibrated to overcome the phase difference problem regarding light beams with different wavelengths passing through the liquid crystal molecules. Therefore, the present invention deals with the phase difference problem by virtue of altering the thickness of the dielectric layer 74. Specifically, the liquid crystal layer 56 has a third thickness in the transmission region 582 of each red pixel region 58, a second thickness in the transmission region 602 of each green pixel region 60, and a first thickness in the transmission region 622 of each blue pixel region 62. In this embodiment, the first thickness is approximately between 2.7 to 4.7 micrometers, and is preferably 3.7 micrometers. The second thickness is approximately between 3.2 to 5.2 micrometers, and is preferably 4.2 micrometers. The third thickness is approximately between 3.5 to 5.5 micrometers, and is preferably 4.5 micrometers. In addition, the thickness of the dielectric layer 74 in the red pixel regions 58, the green pixel regions 60, and the blue pixel regions 62 can be optimized if different back light source and color filters are adopted. The present invention is beneficial because the process of changing the thickness of the dielectric layer 74 in the red pixel regions 58, the green pixel regions 60, and the blue pixel regions 62 is integrated into the process of producing the rough structures 76 positioned in the reflection regions 581, 601, and 621. Consequently, no excessive exposure-and-development process is required.

Figure 4:
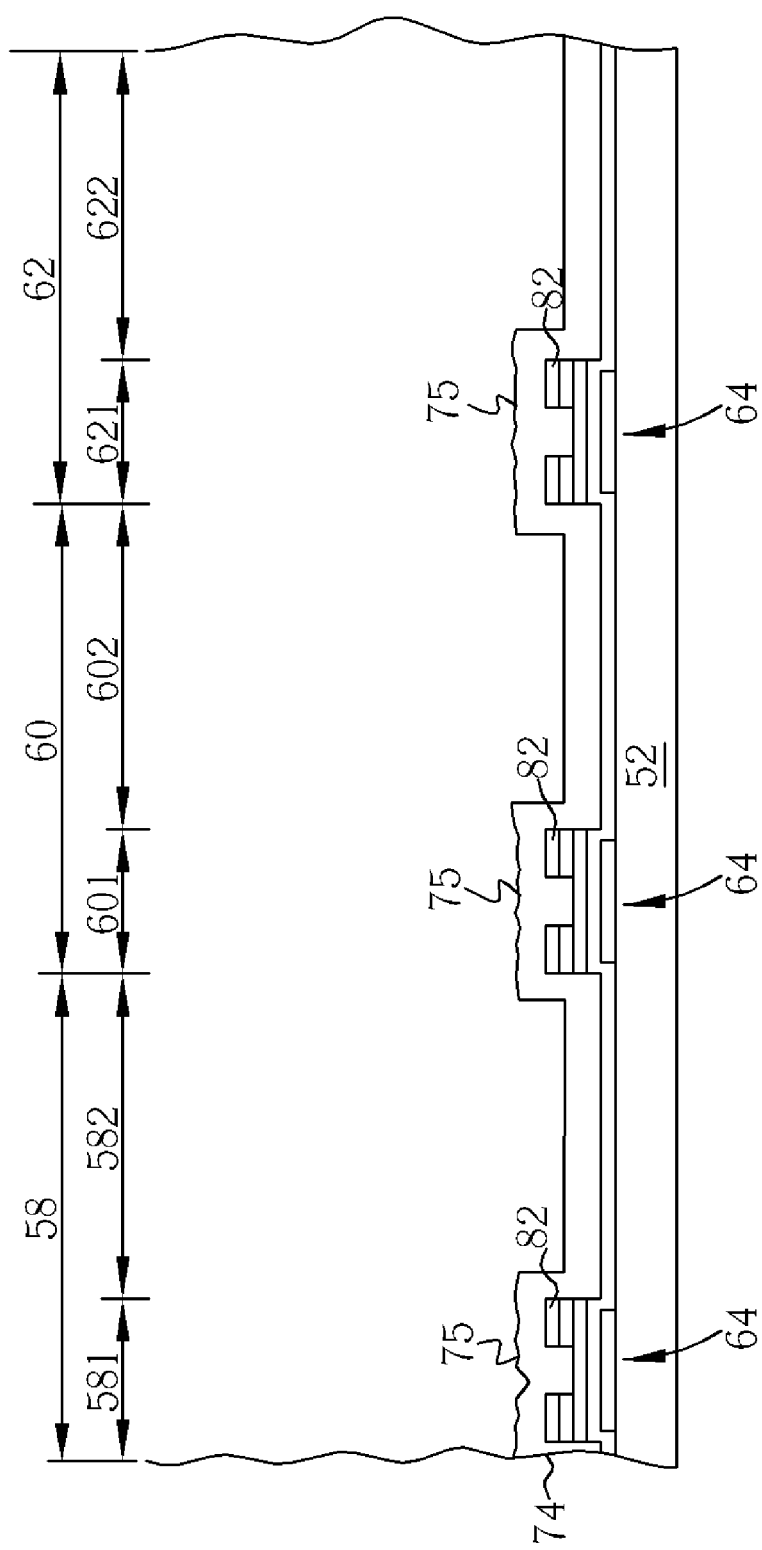

Please refer to FIG. 3 through FIG. 8. FIG. 3 through FIG. 8 are schematic diagrams illustrating a method of making the transflective LCD panel 50 shown in FIG. 2 according to the present invention. As shown in FIG. 3 through FIG. 8, an array substrate 52 and a color filter substrate 54 are provided. The color filter substrate 54 includes a plurality of red pixel regions 58, green pixel regions 60, and blue pixel regions 62. The array substrate 52 includes a plurality of thin film transistors 64 respectively positioned in a plurality of reflection regions 581, 601, and 621 of each red pixel region 58, each green pixel region 60, and each blue pixel region 62. Each of the red pixel regions 58 includes a transmission region 582, each of the green pixel regions 60 includes a transmission region 602, and each of the blue pixel regions 62 includes a transmission region 622. As shown in FIG. 4, a dielectric layer 74 is formed on the surface of the array substrate 52. In this embodiment, the dielectric layer 74 is a photosensitive dielectric layer, and thus can be directly patterned by an exposure-and-development process. Subsequently, a first exposure-and-development process is performed to form rough patterns 75 in the surface of the dielectric layer 74 positioned in the reflection regions 581, 601, and 621. In the first exposure-and-development process, the thickness of the dielectric layer 74 positioned in the transmission regions 582, 602, and 622 is also reduced.

Figure 5:
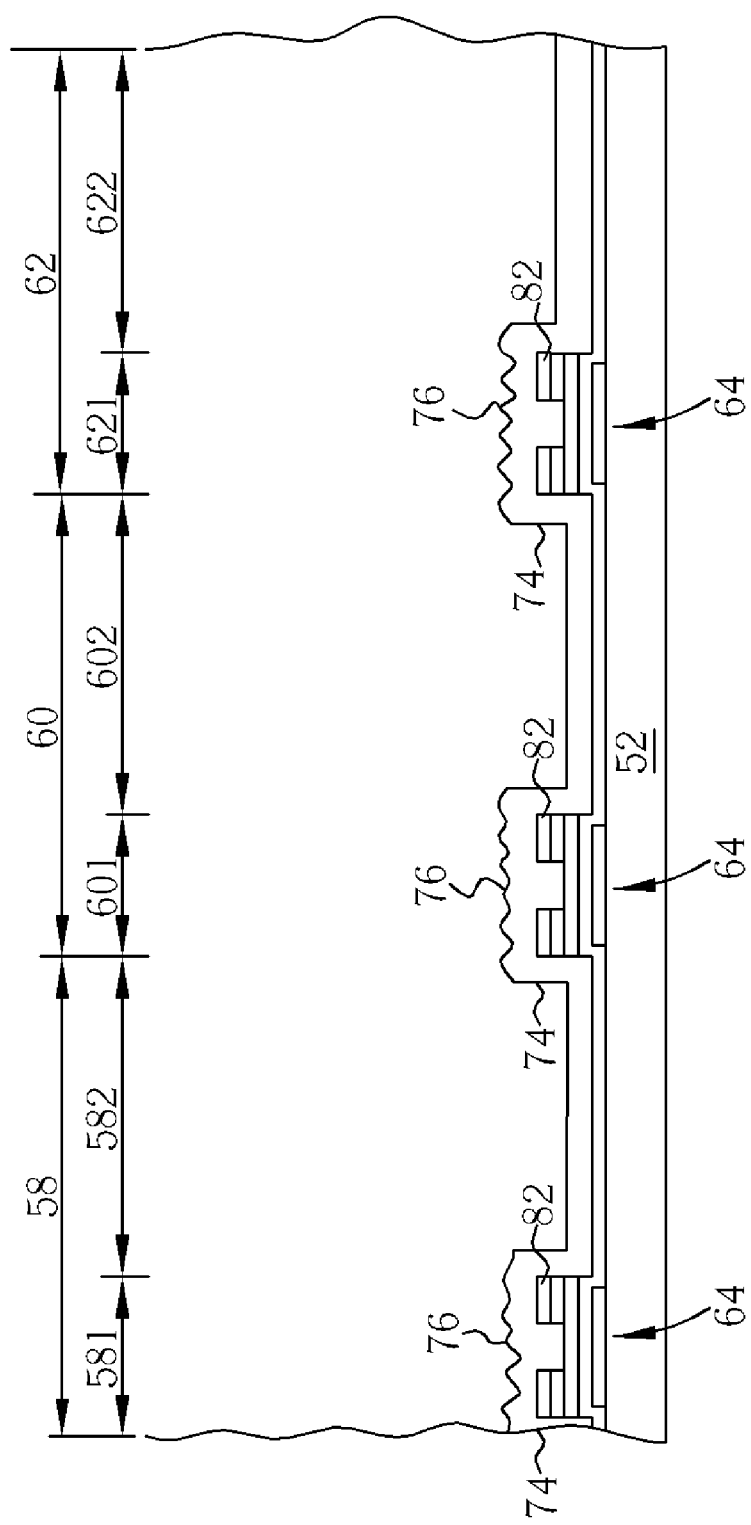
Figure 6:
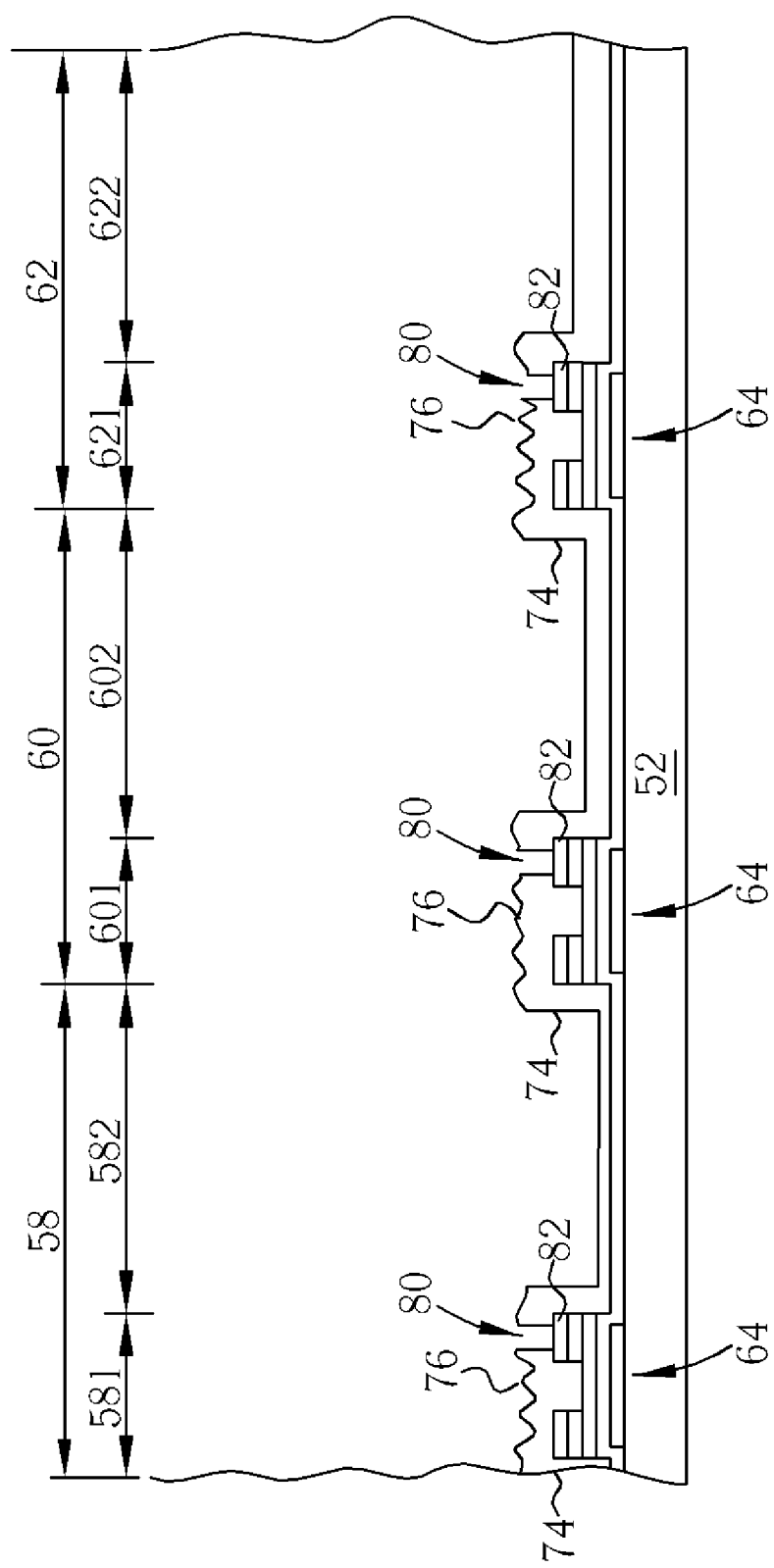

As shown in FIG. 5, a second exposure-and-development process is subsequently performed to form rough structures 76 in the surface of the dielectric layer 74 in the reflection regions 581, 601, and 621. In the second exposure-and-development process, the thickness of the dielectric layer 74 in the transmission regions 582 and 602 is further reduced. As shown in FIG. 6, a third exposure-and-development process is carried out to form a plurality of contact holes 80 in the dielectric layer 74 corresponding to drain electrodes 82 of each thin film transistor 64. In the third exposure-and-development process, the thickness of the dielectric layer 74 in the transmission regions 582 is further reduced. Accordingly, the dielectric layer 74 has different thickness in the transmission region 582 of each red pixel region 58, the transmission region 602 of each green pixel region 60, and the transmission region 622 of each blue pixel region 62. Following that, a heating process is performed to reflow the rough structures 76. The heating process may be a baking process. The rough structures 76 are formed to improve diffraction effects towards external light beams. In this embodiment, the rough patterns 75 are formed in the first exposure-and-development process, and the rough patterns 75 are then reinforced to become the rough structures 76 in the second exposure-and-development process. Accordingly, the reflection layer (not shown) successively formed on the rough structures 76 can obtain better diffraction effects.

Figure 7:
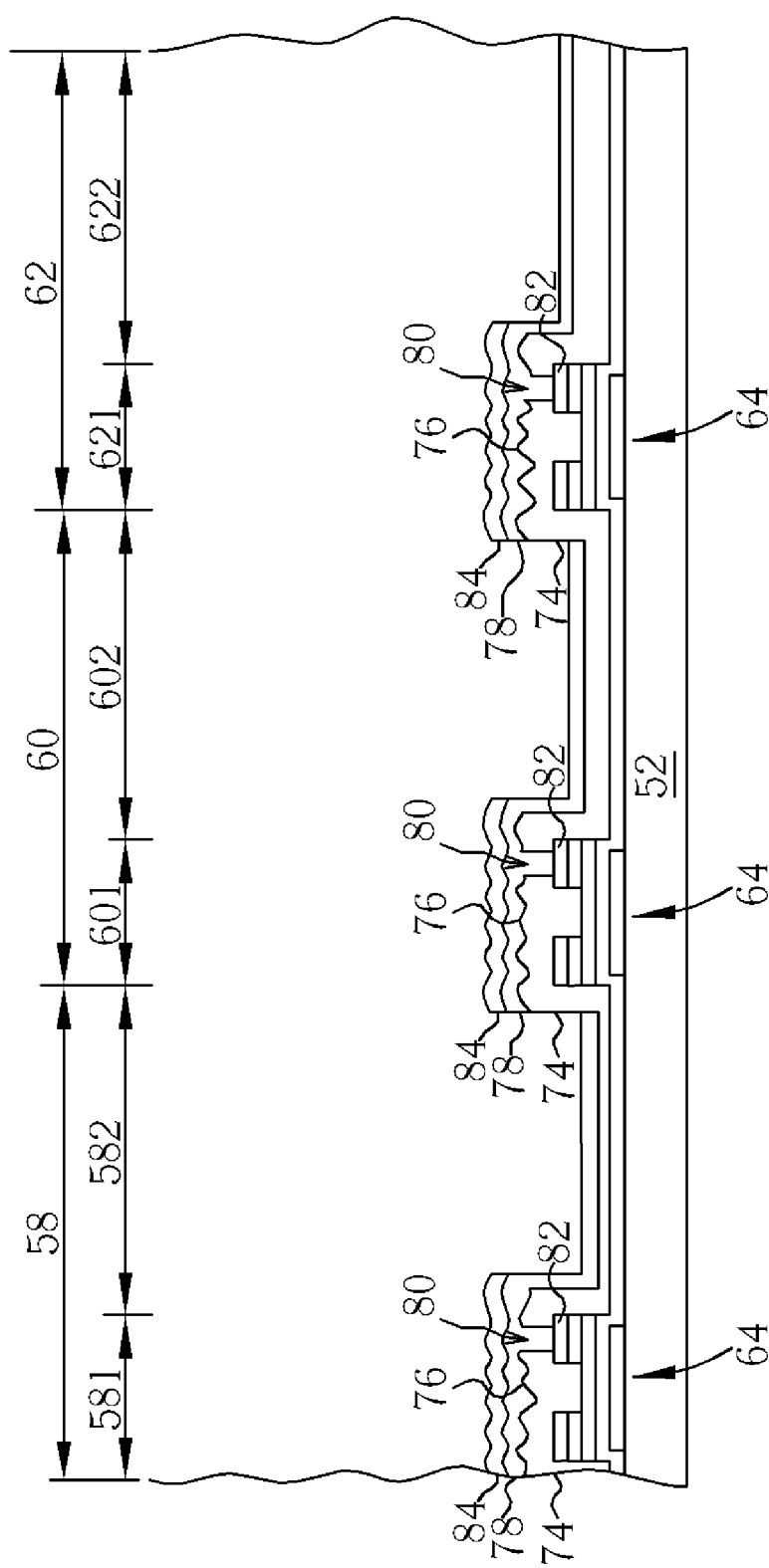

As shown in FIG. 7, a conductive layer 78, such as an ITO layer, is formed on the surface of the dielectric layer 74. The conductive layer 78 is electrically connected to the drain electrode 80 of each thin film transistor 64 to function as pixel electrodes. Subsequently, a reflection layer 84, such as an aluminum layer, is formed on the conductive layer 78 disposed in the reflection regions 581, 601, and 621 to function as reflection electrodes. Since the rough structures 76 are formed in the dielectric layer 74 positioned in the reflection regions 581, 601, and 621, the reflection layer 84 stacked on the dielectric layer 74 also has a rough surface that can diffract external light beams.

Figure 8:
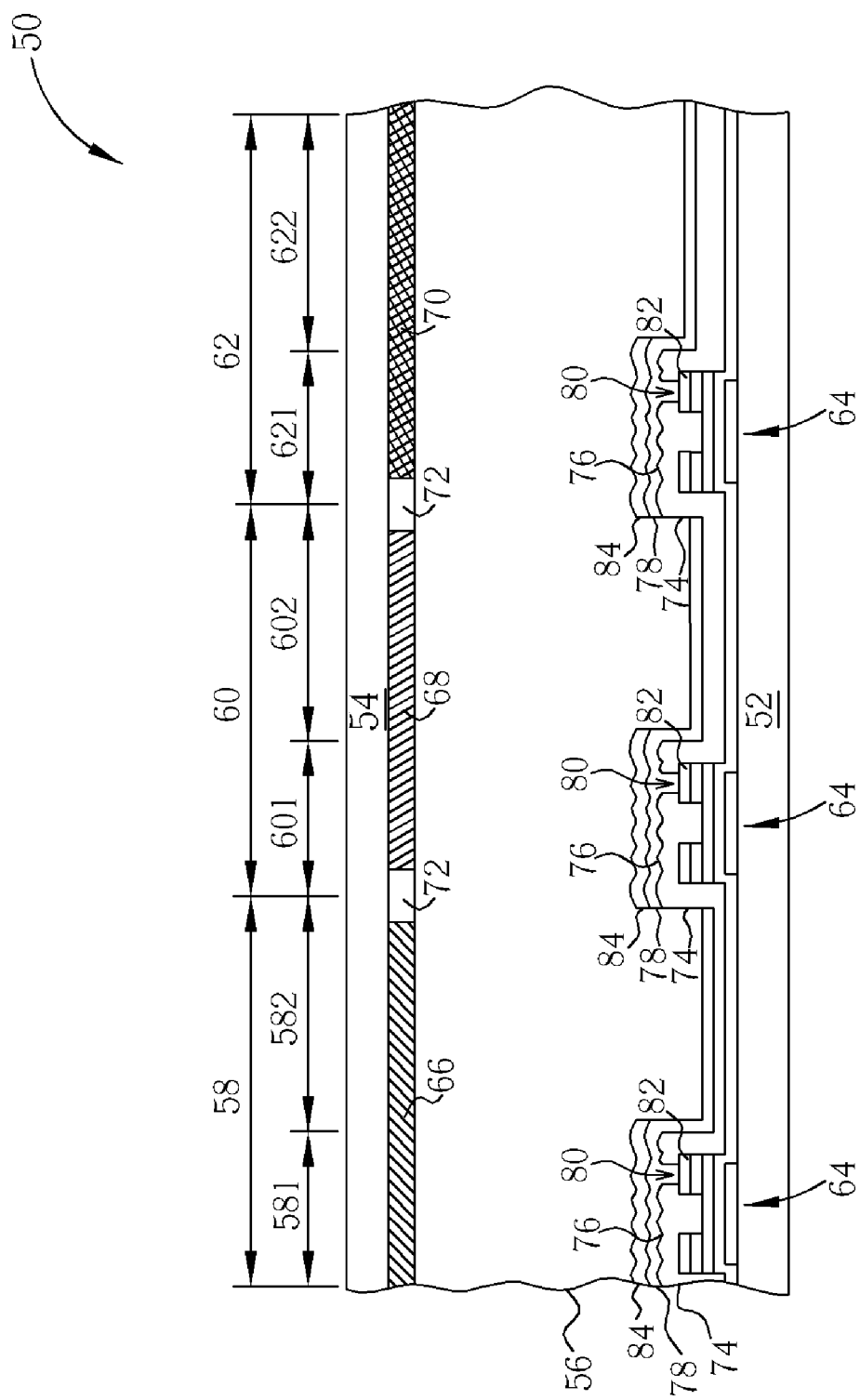

As shown in FIG. 8, a color filter substrate 54 is provided. The color filter substrate 54 includes a plurality of red color filters 66, green color filters 68, and blue color filters 70 respectively disposed corresponding to each red pixel region 58, each green pixel region 60, and each blue pixel region 62. The red color filters 66, the green color filter 68, and the blue color filter 70 have an equal thickness, and are isolated by a black matrix 72. Subsequently, the color filter substrate 54 and the array substrate 52 are assembled together, and a liquid crystal layer 56 is interposed between the color filter substrate 54 and the array substrate 52. Accordingly, the liquid crystal layer 56 has a third thickness in the red pixel regions 58, a second thickness in the green pixel regions 60, and a first thickness in the blue pixel regions 62 due to the dielectric layer 74. In this embodiment, the liquid crystal layer 56 is filled between the color filter substrate 54 and the array substrate 52. However, the ODF, called one drop fill, method can also be adopted to form the liquid crystal layer 56. In that case, the liquid crystal layer 56 is formed on the array substrate 52 before the array substrate 52 and the color filter substrate 54 are assembled together.

In the above embodiment of the present invention, the thickness of the dielectric layer 74 in the blue pixel regions 62 is defined in the first exposure-and-development process, the thickness of the dielectric layer 74 in the green pixel regions 60 is defined in the second exposure-and-development process, and the thickness of the dielectric layer 74 in the red pixel regions 58 is defined in the third exposure-and-development process. However, the present invention is not limited by this embodiment. For instance, the thickness of the dielectric layer 74 in the blue pixel regions 62 can be the initial thickness of the dielectric layer 74, the thickness of the dielectric layer 74 in the green pixel regions 60 can be defined in the first exposure-and-development process, and the thickness of the dielectric layer 74 in the red pixel regions 58 can be defined in the second exposure-and-development process. In addition, if the rough structures 76 with a desired diffraction effect after a single exposure-and-development process is performed, the step of adjusting the thickness of the dielectric layer 74 can also be implemented by two exposure-and-development processes.

In brief, the present invention alters the thickness of the dielectric layer so that the liquid crystal layer has different cell gaps in the red pixel regions, the green pixel regions, and the blue pixel regions. Consequently, the phase differences are calibrated. In addition, the step of adjusting the thickness of the dielectric layer is integrated into the process of forming the rough structures, and thus excessive processing is not required to form different cell gaps. It is noteworthy that the present invention is not limited to fabricating a transflective LCD panel, and can be adopted to make various types of LCD panels, for instance, a reflective LCD or a transmissive LCD.

In comparison with the prior art, the present invention forms different cell gaps by means of changing the thickness of the dielectric layer of the array substrate. In addition, the step of adjusting the thickness of the dielectric layer is integrated into the process of forming the rough structures, and thus excessive processing is not required. Consequently, the manufacturing cost is reduced, and the yield and reliability are ensured.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for manufacturing an LCD panel comprising:
providing a color filter substrate having a plurality of red pixel regions, green pixel regions, and blue pixel regions;
providing an array substrate;
forming a dielectric layer on the array substrate, the dielectric layer comprising a photosensitive dielectric layer having different thickness corresponding to the red pixel regions, the green pixel regions, and the blue pixel regions, wherein the step of forming the dielectric layer having different thickness comprises:
forming the dielectric layer on the array substrate; and
removing a portion of the dielectric layer to make the dielectric layer have different thickness corresponding to the red pixel regions, the green pixel regions, and the blue pixel regions, wherein the step of removing the portion of the dielectric layer comprises:
partially removing the dielectric layer disposed in the red pixel regions, the green pixel regions, and the blue pixel regions so as to form a rough pattern in a reflection region of each red pixel region, each green pixel region, and each blue pixel region, and reduce the thickness of the dielectric layer disposed in a transmission region of each red pixel region, each green pixel region, and each blue pixel region;
partially removing the dielectric layer positioned in the reflection region of each red pixel region, each green pixel region, and each blue pixel region so as to make the rough pattern in each reflection region form a rough structure, and reduce the thickness of the dielectric layer disposed in the transmission region of each red pixel region and each green pixel region; and
partially removing the dielectric layer disposed in the reflection region of each red pixel region, each green pixel region, and each blue pixel region so as to form a contact hole in each reflection region, and reduce the thickness of the dielectric layer disposed in the transmission region of each red pixel region;
assembling the color filter substrate and the array substrate; and
providing a liquid crystal layer between the array substrate and the color filter substrate.

2. The method of claim 1, wherein the liquid crystal layer has a first thickness, a second thickness and a third thickness corresponding to the blue pixel regions, the green pixel regions, and the red pixel regions, respectively, the first thickness is less than the second thickness and the second thickness is less than the third thickness.

3. The method of claim 1, wherein the step of assembling the color filter substrate and the array substrate is performed subsequent to the step of providing the liquid crystal layer between the array substrate and the color filter substrate.

4. The method of claim 1, further comprising performing a heating process on the rough structures.

5. The method of claim 1, further comprising forming a plurality of thin film transistors corresponding to the reflection regions in the array substrate prior to forming the dielectric layer.

6. The method of claim 5, further comprising:
forming a conductive layer on the dielectric layer, the conductive layer being electrically connected to the drain electrode of each thin film transistor with the contact holes; and
forming a reflection layer on the conductive layer in each reflection region.

7. The method of claim 2, wherein the first thickness is approximately between 2.7 and 4.7 micrometers.

8. The method of claim 7, wherein the first thickness is approximately 3.7 micrometers.

9. The method of claim 2, wherein the second thickness is approximately between 3.2 and 5.2 micrometers.

10. The method of claim 9, wherein the second thickness is approximately 4.2 micrometers.

11. The method of claim 2, wherein the third thickness is approximately between 3.5 and 5.5 micrometers.

12. The method of claim 11, wherein the third thickness is approximately 4.5 micrometers.

* * * * *